United States Patent
Noguchi et al.

(10) Patent No.: US 6,847,184 B2
(45) Date of Patent: Jan. 25, 2005

(54) EXCITATION CONTROLLER

(75) Inventors: Shinya Noguchi, Tokyo (JP); Seiichi Tanaka, Tokyo (JP); Masaru Shimomura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 75 days.

(21) Appl. No.: 10/442,296

(22) Filed: May 21, 2003

(65) Prior Publication Data

US 2004/0119437 A1 Jun. 24, 2004

(30) Foreign Application Priority Data

Dec. 19, 2002 (JP) ........................................ 2002-367616

(51) Int. Cl.$^7$ .............................. H02P 9/10; H02P 9/14; H02P 9/00
(52) U.S. Cl. ........................ 318/700; 318/712; 318/713; 322/59; 322/28; 322/21
(58) Field of Search ................................. 318/700, 713, 318/714; 322/19–21, 24, 25, 28, 45, 59; 323/204, 205, 299–301

(56) References Cited

U.S. PATENT DOCUMENTS

| | | | | |
|---|---|---|---|---|
| 3,621,369 A | * | 11/1971 | Masaomi et al. | 322/19 |
| 4,245,182 A | * | 1/1981 | Aotsu et al. | 322/20 |
| 4,329,637 A | * | 5/1982 | Kotake et al. | 322/20 |
| 4,350,947 A | * | 9/1982 | Uenosono et al. | 322/17 |
| 4,701,689 A | * | 10/1987 | Yuan et al. | 322/19 |
| 4,714,869 A | * | 12/1987 | Onitsuka | 322/20 |
| 4,812,729 A | * | 3/1989 | Ito et al. | 318/732 |
| 4,816,696 A | * | 3/1989 | Sakayori et al. | 290/52 |
| 4,843,296 A | * | 6/1989 | Tanaka | 318/800 |
| 4,920,277 A | * | 4/1990 | Kuwabara et al. | 290/40 C |
| 5,148,093 A | * | 9/1992 | Bando et al. | 318/723 |
| 5,440,222 A | * | 8/1995 | Tanaka et al. | 322/25 |
| 5,604,420 A | * | 2/1997 | Nambu | 322/19 |
| 5,977,731 A | * | 11/1999 | Xia et al. | 318/147 |
| 6,265,852 B1 | | 7/2001 | Kitamura et al. | |
| 6,285,168 B1 | * | 9/2001 | Davis | 322/20 |
| 6,323,618 B1 | | 11/2001 | Kitamura et al. | |
| 6,465,979 B1 | * | 10/2002 | Leijon et al. | 318/438 |
| 6,525,504 B1 | * | 2/2003 | Nygren et al. | 318/700 |

OTHER PUBLICATIONS

Kitamura et al., "Improvement of Voltage Stability by the Advanced High Side Voltage Control Regulator," IEEE, Jun. 2000.

* cited by examiner

*Primary Examiner*—David Martin
*Assistant Examiner*—Eduardo Colon Santana
(74) *Attorney, Agent, or Firm*—Leydig, Voit & Mayer, Ltd.

(57) ABSTRACT

An excitation controller controls excitation of a synchronous machine, which is connected to a power transmission system through a transformer, so that a high-side voltage of the transformer is maintained at a target voltage with high accuracy. An output terminal target voltage of the synchronous machine is set to precisely compensate for a voltage drop in the transformer, corresponding to the transformer phase angle variation. To achieve this result, the excitation controller detects an output terminal voltage and an output current of the synchronous machine and calculates active and reactive currents of the output current, sets the output terminal target voltage of the synchronous machine from the active and reactive currents, the high-side voltage of the transformer, and the reactance of the transformer, and controls excitation of the synchronous machine to compensate for the voltage drop in the transformer corresponding to phase angle variation of the transformer.

8 Claims, 6 Drawing Sheets

US 6,847,184 B2

EXCITATION CONTROLLER

BACKGROUND OF THE INVENTION

1. Field of the Invention

The present invention relates to an excitation controller for stabilizing voltage in an electric power system.

2. Description of the Background Art

An example of a conventional excitation controller for controlling excitation of a synchronous machine connected to a power transmission system through a transformer is disclosed in Japanese Laid-open Patent Publication No. 2000-308397 (corresponding to U.S. Pat. No. 6,265,852). The excitation controller of the Publication detects a voltage $V_G$ at an output terminal of the synchronous machine and a reactive current $I_Q$ output from the synchronous machine, causes a voltage setter to set an output terminal target voltage $V_{Gref}$ of the synchronous machine based on the reactive current $I_Q$ and a high-side target voltage $V_{Href}$ of the transformer such that a relationship expressed by $V_{Gref} = V_{Href} + X_t \cdot I_Q$ is satisfied (where $X_t$ is the reactance of the transformer), and controls an excitation system of the synchronous machine based on a deviation of the detective output terminal voltage $V_G$ from the output terminal target voltage $V_{Gref}$ of the synchronous machine.

More specifically, the aforementioned conventional excitation controller estimates a high-side voltage $V_H$ of the transformer from the output terminal voltage $V_G$, the reactive current $I_Q$ of the synchronous machine and the reactance $X_t$ of the transformer by using a relationship $V_H = V_G - X_t \cdot I_Q$, from which the output terminal voltage $V_G$ of the synchronous machine is expressed by the following equation:

$$V_G = V_H + X_t \cdot I_Q \quad (1)$$

Then, the excitation controller sets the output terminal target voltage $V_{Gref}$ as indicated by the following equation to compensate for a voltage drop occurring in the transformer from its high-side target voltage $V_{Href}$:

$$V_{Gref} = V_{Href} + X_t \cdot I_Q \quad (2)$$

However, since the amount of a voltage change in the transformer varies also with phase angle variations $\Delta \delta$ occurring in the transformer, the output terminal voltage $V_G$ of the synchronous machine is actually given by the following equation:

$$V_G = V_H \cdot \cos \Delta \delta + X_t \cdot I_Q \quad (3)$$

which is different from the value given by equation (1).

It is therefore impossible to exactly set the output terminal target voltage $V_{Gref}$ of the synchronous machine, because the aforementioned phase angle variations $\Delta \delta$ are not taken into account in the output terminal target voltage $V_{Gref}$ calculated by equation (2) above. This calculation error becomes more significant as the phase angle variation $\Delta \delta$ in the transformer increases. For this reason, it has been difficult to keep the high-side voltage $V_H$ of the transformer, that is, the voltage applied to a transmission bus, at the target voltage $V_{Href}$ with high reliability.

SUMMARY OF THE INVENTION

The present invention is intended to provide a solution to the aforementioned problem of the prior art. Accordingly, it is an object of the invention to provide an excitation controller of a synchronous machine which can improve voltage stability of an entire power transmission system by setting an accurate output terminal target voltage $V_{Gref}$ of the synchronous machine taking into account phase angle variations occurring in a transformer and thereby maintaining a high-side voltage $V_H$ of the transformer, or the voltage applied to a transmission bus, at a desired level with high reliability.

According to the invention, an excitation controller includes a voltage detector for detecting an output terminal voltage of a synchronous machine connected to a power transmission system through a transformer, a current detector for detecting an output current of the synchronous machine, and a voltage setter for setting an output terminal target voltage of the synchronous machine based on the output current of the synchronous machine detected by the current detector, the reactance of the transformer, and a high-side target voltage of the transformer. The excitation controller of the invention controls an excitation system of the synchronous machine based on a deviation of the output terminal voltage of the synchronous machine detected by the voltage detector from the output terminal target voltage set by the voltage setter, wherein active current and reactive current of the output current of the synchronous machine are calculated from the output current detected by the current detector and the output terminal voltage detected by the voltage detector, and the voltage setter calculates and sets the output terminal target voltage of the synchronous machine to compensate for a voltage drop in the transformer corresponding to a phase angle variation which is a voltage phase difference between high-voltage and low-voltage sides of the transformer.

The excitation controller thus constructed makes it possible to maintain the high-side voltage of the transformer at its high-side target voltage with high reliability and improve voltage stability of the entire power transmission system.

These and other objects, features and advantages of the invention will become more apparent upon reading the following detailed description along with the accompanying drawings.

DESCRIPTION OF THE PREFERRED EMBODIMENTS

Specific embodiments of the invention is now described with reference to the drawings.

First Embodiment

Figure 1:
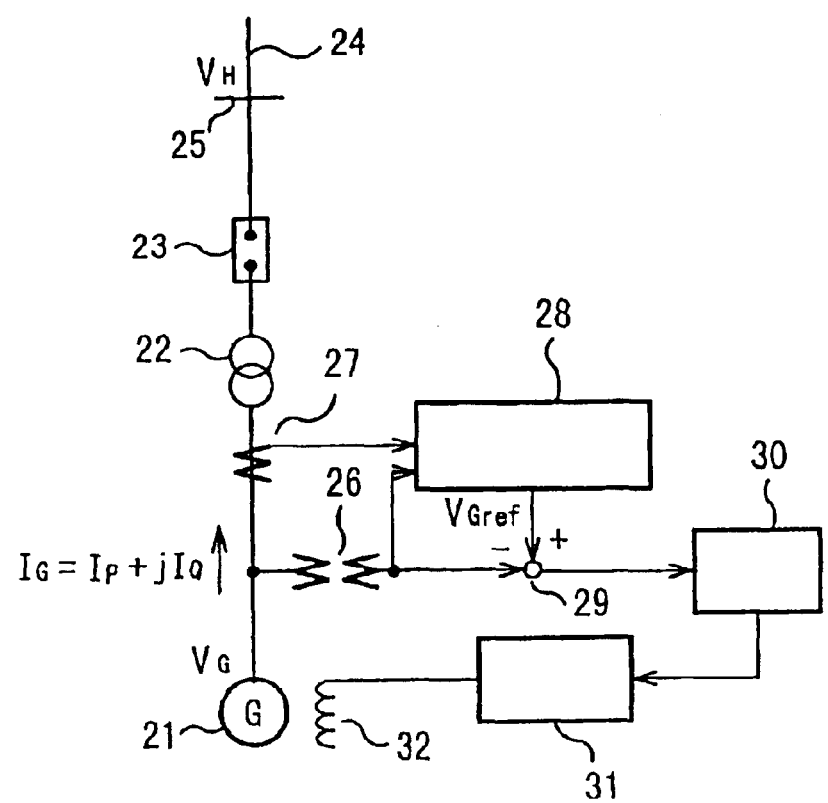
FIG. 1 is a configuration diagram mainly showing an excitation controller according to a first embodiment of the invention.

FIG. 1 is a general configuration diagram of an excitation controller according to a first embodiment of the invention. A synchronous machine 21 is connected to a power transmission system through a transformer 22. The excitation controller controls an exciter 31 which supplies a field current to a field winding 32 of the synchronous machine 21. As depicted in FIG. 1, the excitation controller includes a potential transformer (hereinafter referred to as PT) 26 serving as a voltage detector for detecting an output terminal voltage $V_G$ of the synchronous machine 21, a current transformer (hereinafter referred to as CT) 27 serving as a current detector for detecting a current $I_G$ output from the synchronous machine 21, a voltage setter 28 for setting an output terminal target voltage $V_{Gref}$ of the synchronous machine 21, a subtracter 29, and an automatic voltage regulator (hereinafter referred to as AVR) 30 for controlling rectification timing of the exciter 31. Referring also to FIG. 1, designated by the reference numeral 23 is a circuit breaker, designated by the reference numeral 24 is a transmission line, and designated by the reference numeral 25 is a transmission bus of a power plant.

Figure 2:
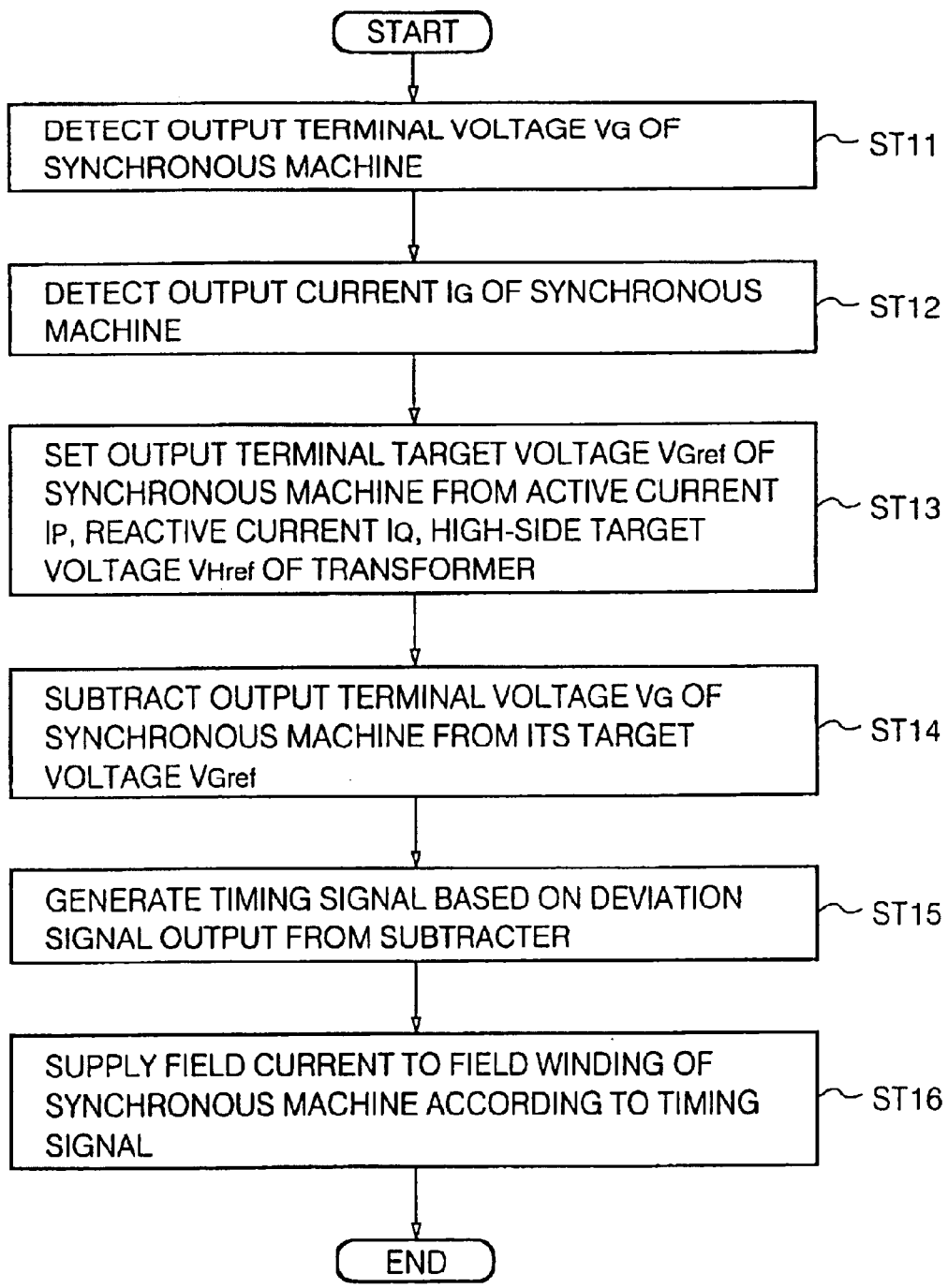
FIG. 2 is a flowchart showing the operation of the excitation controller according to the first embodiment of the invention.

Operation of the excitation controller thus constructed is described in the following referring to a flowchart shown in FIG. 2.

First, the PT 26 detects the output terminal voltage $V_G$ of the synchronous machine 21 (step ST11), and the CT 27 detects the output current $I_G$ of the synchronous machine 21 (step ST12).

Then, the voltage setter 28 calculates an active current $I_P$ and a reactive current $I_Q$ of the output current $I_G$ from the output terminal voltage $V_G$ and the output current $I_G$ of the synchronous machine 21 detected by the PT 26 and the CT 27, respectively, and determines and sets an output terminal target voltage $V_{Gref}$ of the synchronous machine 21 from the active current $I_P$ and the reactive current $I_Q$ so obtained as well as a preset high-side target voltage $V_{Href}$ and a known reactance $X_t$ of the transformer 22 using a specific calculation process which will be later described (step ST13).

Next, the subtracter 29 subtracts the output terminal voltage $V_G$ of the synchronous machine 21 detected by the PT 26 from the target voltage $V_{Gref}$ set by the voltage setter 28 and outputs a deviation signal indicating the result of subtraction (step ST14). The deviation signal output from the subtracter 29 is delivered to the AVR 30, and the AVR 30 produces a timing signal for controlling the rectification timing of the exciter 31 using the deviation signal as an input condition (step ST15). The exciter 31 supplies the field current to the field winding 32 of the synchronous machine 21 according to the timing signal fed from the exciter 31 (step ST16).

As a result, the output terminal voltage $V_G$ of the synchronous machine 21 is controlled such that it coincides with the target voltage $V_{Gref}$, and a high-side voltage $V_H$ of the transformer 22 is controlled such that it coincides with the high-side target voltage $V_{Href}$.

The output terminal target voltage $V_{Gref}$ of the synchronous machine 21 set by the voltage setter 28 in step ST13 above is now described in detail below.

Taking into account a phase angle variation $\Delta\delta$, which is a voltage phase difference between high-voltage and low-voltage sides of the transformer 22, the relationship between the output terminal voltage $V_G$ of the synchronous machine 21 and the high-side voltage $V_H$ of the transformer 22 is expressed by the earlier-mentioned equation (3) by using the reactive current $I_Q$ of the synchronous machine 21 and the reactance $X_t$ of the transformer 22. The relationship between the high-side voltage $V_H$ and the reactive current $I_Q$ is expressed by equation (4) below:

$$V_H \sin \Delta\delta = X_t I_Q \tag{4}$$

From equations (3) and (4), the high-side voltage $V_H$ of the transformer 22 is given by equation (5) below:

$$V_H = \sqrt{(X_t I_P)^2 + (V_G - X_t I_Q)} \tag{5}$$

Also, the output terminal voltage $V_G$ of the synchronous machine 21 is given by equation (6) below:

$$V_G = \sqrt{+e, rad\ V_H^2}$$
$$-(X_t I_P)^2 + ee$$
$$+X_t I_Q \tag{6}$$

Using equation (6) above, the output terminal target voltage $V_{Gref}$ of the synchronous machine 21 can be calculated from the active current $I_P$, the reactive current $I_Q$, the high-side target voltage $V_{Href}$ of the transformer 22 and the reactance $X_t$ of the transformer 22 as shown by equation (7) below:

$$V_{Gref} = \sqrt{+e, rad\ V_{Href}^2}$$
$$-(X_t I_P)^2 + ee$$
$$+X_t I_Q \tag{7}$$

According to the present embodiment, the active current $I_P$ and the reactive current $I_Q$ of the output current $I_G$ are calculated from the output terminal voltage $V_G$ of the synchronous machine 21 detected by the PT 26 and the output current $I_G$ Of the synchronous machine 21 detected by the CT 27, and the output terminal target voltage $V_{Gref}$ of the synchronous machine 21 is set by using the active current $I_P$ and the reactive current $I_Q$ so obtained as well as the preset high-side target voltage $V_{Href}$ and the known reactance $X_t$ of the transformer 22 to compensate for a voltage drop in the transformer 22 corresponding to the phase angle variation $\Delta\delta$ occurring therein. This arrangement of the embodiment makes it possible to maintain the high-side voltage $V_H$ of the transformer 22, or the voltage applied to the transmission bus 25, at the high-side target voltage $V_{Href}$ with high reliability and improve voltage stability of the entire power transmission system.

Second Embodiment

Figure 3:
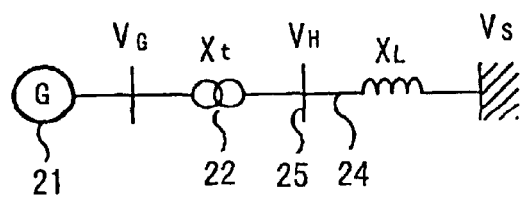
FIG. 3 is a general configuration diagram of an electric power system according to the first embodiment of the invention.
Figure 4:
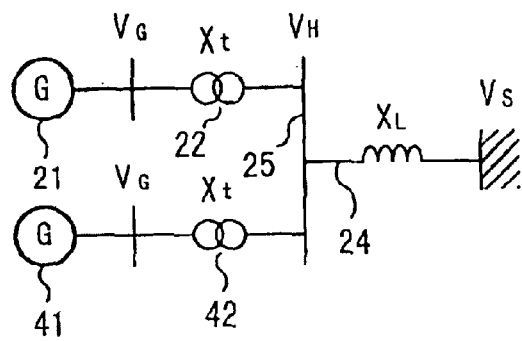
FIG. 4 is a general configuration diagram of an electric power system according to a second embodiment of the invention.

In the aforementioned first embodiment, voltage changes caused by the reactance $X_t$ of the transformer 22 are fully (100%) compensated for on the assumption that only one synchronous machine 21 is connected to the power transmission system as shown in FIG. 1. If two synchronous machines 21, 41 or more are connected to the power transmission system as shown in FIG. 4 and the reactance $X_t$ of each transformer 22 is fully compensated for, however, the reactance between the two synchronous machines 21, 41 becomes nearly zero, so that a cross current flows between the synchronous machines 21, 41 due to a difference in their output terminal voltages $V_G$ and a difference in their responses to voltage changes. This would destroy a load balance between the two synchronous machines 21, 41, potentially overloading one of them. In FIGS. 3 and 4, $X_L$ designates the reactance of the transmission line 24.

A second embodiment of the invention is directed toward the solution of this problem. Specifically, the output terminal target voltage $V_{Gref}$ of the synchronous machine 21 set by the voltage setter 28 is calculated by using a value obtained by subtracting a reactance $X_{DR}$ corresponding to a suppressed component of the cross current of the reactance $X_t$ of the transformer 22 from the reactance $X_t$ as shown in equation (8) below:

$$V_{Gref} = \sqrt{V_{Href}^2 - \{(X_t - X_{DR}) \cdot I_P\}^2} + (X_t - X_{DR}) \cdot I_Q \quad (8)$$

where the reactance $X_{DR}$ is determined empirically based on such conditions as the characteristics of the synchronous machines 21, 41 and the power transmission system. For example, it is set to a value corresponding to a few percent based on the capacity of the synchronous machine 21 (41).

Figure 5:
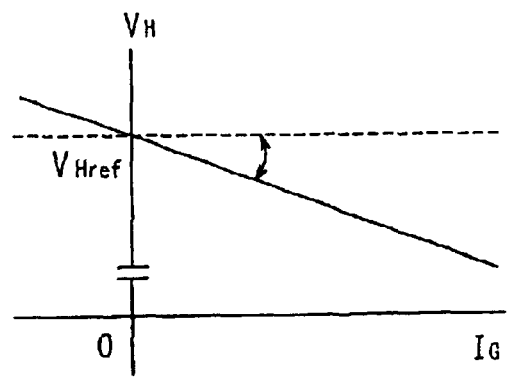
FIG. 5 is a diagram showing the relationship between a high-side voltage and a high-side target voltage of a transformer according to the second embodiment of the invention.

The high-side voltage $V_H$ of the transformer 22 becomes lower than the high-side target voltage $V_{Href}$ due to the influence of the reactance $X_{DR}$ as individual components (active current $I_P$, reactive current $I_Q$) of the output current $I_G$ of the synchronous machine 21 increase as shown in FIG. 5. This does not pose any practical problem in this embodiment, however, because the reactance $X_{DR}$ has the value corresponding to a few percent and the high-side voltage $V_H$ of the transformer 22 is so controlled as to become approximately match the target voltage $V_{Href}$.

In this embodiment, the output terminal target voltage $V_{Gref}$ of the synchronous machine 21 set by the voltage setter 28 is calculated by equation (8) shown above. This makes it possible to reliably maintain the voltage applied to the transmission bus 25 by compensating for voltage changes occurring in the transformer 22 due to phase angle variations therein as in the first embodiment, avoid the occurrence of the cross current between the synchronous machines 21, 41 connected to the power transmission system, and prevent overloading the synchronous machines 21, 41, thereby improving overall system reliability.

If the reactance $X_{DR}$ corresponding to the suppressed component of the cross current of the reactance $X_t$ is set to a common value for all the synchronous machines connected to the power transmission system, a situation equivalent to what would occur when the transformers of the same reactance (i.e., the reactance $X_{DR}$ to be set) are connected to the multiple synchronous machines connected to the power transmission system would take place. Accordingly, the embodiment obviates the need for taking into account the difference between the reactances of the multiple transformers in operating the transmission system, effectively facilitating system operation.

Third Embodiment

While the reactance $X_{DR}$ corresponding to the suppressed component of the cross current is subtracted from the reactance $X_t$ of the transformer 22 in the aforementioned second embodiment, the cross current is caused only by the reactive current $I_Q$ of the output current $I_G$ (active current $I_P$, reactive current $I_Q$) of the synchronous machine 21 (41).

Taking this into consideration, a third embodiment of the invention employs an arrangement for calculating the output terminal target voltage $V_{Gref}$ of the synchronous machine 21 set by the voltage setter 28 using equation (9) below:

$$V_{Gref} = \sqrt{V_{Href}^2 - (X_t \cdot I_P)^2} + (X_t - X_{DR}) \cdot I_Q \quad (9)$$

As indicated in the above equation, the reactance $X_t$ of the transformer 22 is used directly as an active current which does not cause the cross current and only the reactive current which causes the cross current, or the reactance $X_{DR}$ for suppressing the cross current, is subtracted from the reactance $X_t$ of the transformer 22. As a result, the present embodiment makes it possible to control the high-side voltage $V_H$ of the transformer 22 to match the target voltage $V_{Href}$ in an improved fashion while effectively suppressing the cross current.

Figure 6:
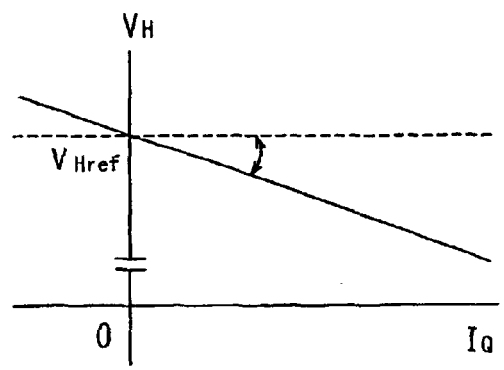
FIG. 6 is a diagram showing the relationship between the high-side voltage and the high-side target voltage of the transformer according to a third embodiment of the invention.

Although the high-side voltage $V_H$ of the transformer 22 becomes progressively lower than the target voltage $V_{Href}$ as the reactive current $I_Q$ of the output current $I_G$ of the synchronous machine 21 increases as shown in FIG. 6 in this embodiment, the amount of the active current $I_P$ does not have a marked influence on the high-side voltage $V_H$.

Fourth Embodiment

In the aforementioned second embodiment, the reactance $X_{DR}$ corresponding to the suppressed component of the cross current of the reactance $X_t$ is used so that the high-side voltage $V_H$ of the transformer 22 matches the target voltage $V_{Href}$ when the individual components (active current $I_P$, reactive current $I_Q$) of the output current $I_G$ of the synchronous machine 21 are zero, and becomes lower than the target voltage $V_{Href}$ as the individual components of the output current $I_G$ increase as shown in FIG. 5.

Figure 7:
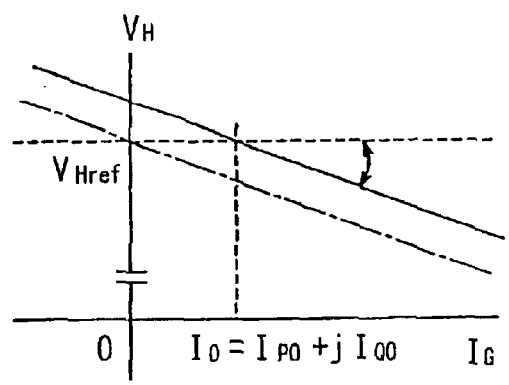
FIG. 7 is a diagram showing the relationship between the high-side voltage and the high-side target voltage of the transformer according to a fourth embodiment of the invention.

A fourth embodiment of the invention employs an arrangement for correcting the high-side voltage $V_H$ of the transformer 22 such that it matches the target voltage $V_{Href}$ when the output current $I_G$ (active current $I_P$, reactive current $I_Q$) of the synchronous machine 21 coincides with a reference current value $I_0$ (active current $I_{P0}$, reactive current $I_{Q0}$), such as a value effective under rated operating conditions, as shown in FIG. 7.

Specifically, the output terminal target voltage $V_{Gref}$ of the synchronous machine 21 set by the voltage setter 28 is calculated by using equation (10) below in this embodiment:

$$V_{Gref} = \sqrt{+e, rad\ V_{Href}^2 - \{(X_t - X_{DR}) \cdot I_P + X_{DR} \cdot I_{P0}\}^2} + ee + (X_t - X_{DR}) \cdot I_Q + X_{DR} \cdot I_{Q0} \quad (10)$$

In this embodiment, the high-side voltage $V_H$ of the transformer 22 is controlled such that it matches the target voltage $V_{Href}$ when the synchronous machine 21 outputs the reference current value $I_0$ (active current $I_{P0}$, reactive current $I_{Q0}$). According to this arrangement, the high-side voltage $V_H$ of the transformer 22 can be controlled such that it matches the target voltage $V_{Href}$ more accurately than in the second embodiment. It is therefore possible to maintain the voltage applied to the transmission bus 25 at the high-side target voltage $V_{Href}$ with high reliability while preventing the occurrence of a cross current between the synchronous machines connected to the power transmission system. This serves to further improve voltage stability of the entire power transmission system.

Fifth Embodiment

In the aforementioned third embodiment, only the reactive current which causes the cross current, or the reactance $X_{DR}$ for, suppressing the cross current, is subtracted from the reactance $X_t$ of the transformer 22 so that the high-side voltage $V_H$ of the transformer 22 matches the target voltage $V_{Href}$ when the reactive current $I_Q$ of the output current $I_G$ of the synchronous machine 21 is zero, and becomes lower than the target voltage $V_{Href}$ as the reactive current $I_Q$ increases as shown in FIG. 6.

Figure 8:
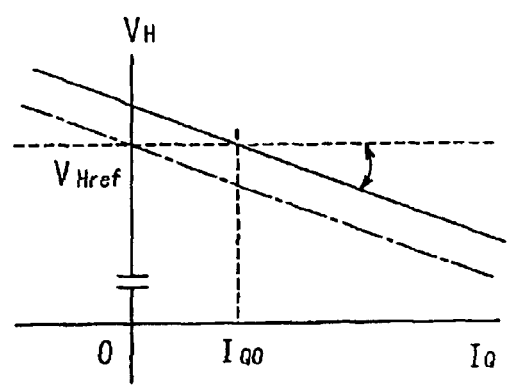
FIG. 8 is a diagram showing the relationship between the high-side voltage and the high-side target voltage of the transformer according to a fifth embodiment of the invention.

A fifth embodiment of the invention employs an arrangement for correcting the high-side voltage $V_H$ of the transformer 22 such that it matches the target voltage $V_{Href}$ when the reactive current $I_Q$ of the output current $I_G$ of the synchronous machine 21 matches a reference reactive current value $I_{Q0}$, such as a value effective under rated operating conditions, as shown in FIG. 8.

Specifically, the output terminal target voltage $V_{Gref}$ of the synchronous machine 21 set by the voltage setter 28 is calculated by using equation (11) below in this embodiment:

$$V_{Gref} = \sqrt{V_{Href}^2 - (X_t \cdot I_P)^2} + (X - X_{DR}) \cdot I_Q + X_{DR} \cdot I_{Q0} \quad (11)$$

In this embodiment, the high-side voltage $V_H$ of the transformer 22 is controlled such that it matches the target voltage $V_{Href}$ when the synchronous machine 21 outputs the reference reactive current value $I_{Q0}$. According to this arrangement, the high-side voltage $V_H$ of the transformer 22 can be controlled such that it matches the target voltage $V_{Href}$ more accurately than in the third embodiment. It is therefore possible to maintain the voltage applied to the transmission bus 25 at the high-side target voltage $V_{Href}$ with high reliability while preventing the occurrence of the cross current between the synchronous machines connected to the power transmission system. This serves to further improve voltage stability of the entire power transmission system.

Sixth Embodiment

In the aforementioned fourth and fifth embodiments, the high-side voltage $V_H$ of the transformer 22 is controlled such that it matches the target voltage $V_{Href}$ when the synchronous machine 21 outputs the reference current value $I_0$ (active current $I_{P0}$, reactive current $I_{Q0}$) and the reference reactive current value $I_{Q0}$, respectively. In these embodiments, the active current $I_P$ varies depending on operating conditions of the synchronous machine 21 and the reactive current $I_Q$ varies when the target voltage $V_{Href}$ is altered.

Figure 9:
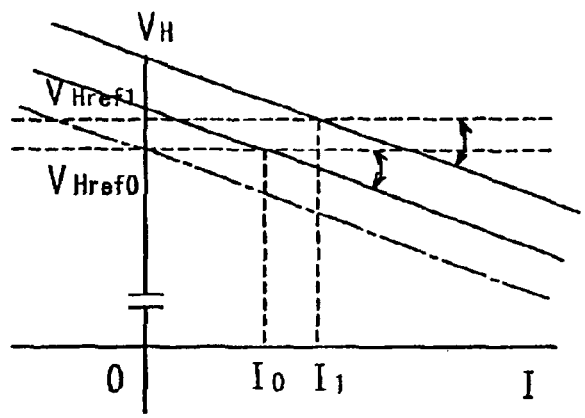
FIG. 9 is a diagram showing the relationship between the high-side voltage and the high-side target voltage of the transformer according to a sixth embodiment of the invention.

Taking this into consideration, a sixth embodiment of the invention employs an arrangement for setting the reference active current value $I_{P0}$ and the reference reactive current value $I_{Q0}$ according to the operating conditions of the synchronous machine 21 and the target voltage $V_{Href}$ of the transformer 22. For example, the reference current value $I_0$ (active current $I_{P0}$, reactive current $I_{Q0}$) is set for a high-side target voltage $V_{Href0}$ of the transformer 22 and a reference current value $I_1$ (active current $I_{P1}$, reactive current $I_{Q1}$) is set for a high-side target voltage $V_{Href1}$ of the transformer 22 as shown in FIG. 9. As a result, it becomes possible to control the high-side voltage $V_H$ of the transformer 22 such that it matches the target voltage $V_{Href}$ even when the high-side target voltage $V_{Href}$ of the transformer 22 is changed.

This arrangement of the embodiment makes it possible to further improve the reliability of control for maintaining the voltage applied to the transmission bus 25 and achieve an effect of maintaining a higher voltage on the power transmission system and its voltage stability.

Seventh Embodiment

While the value obtained by subtracting the suppressed component of the cross current from the reactance $X_t$ of the transformer 22 is used in the calculation performed by the voltage setter 28 in the foregoing first to sixth embodiments, a seventh embodiment of the invention employs an arrangement for setting the output terminal target voltage $V_{Gref}$ of the synchronous machine 21 such that the high-side voltage $V_H$ of the transformer 22 varies with changes in the reactive current $I_Q$ only, regardless of changes in the active current $I_P$.

Specifically, the high-side voltage $V_H$ of the transformer 22 is expressed by equation (12) below, using a voltage droop rate $X_D$ set to a specific value representing the influence of the reactive current $I_Q$ on the target voltage $V_{Href}$ of the high-side voltage $V_H$ of the transformer 22:

$$V_H = V_{Href} - X_D \cdot I_Q \quad (12)$$

Using equation (12) above and the earlier-mentioned equation (5) which gives the high-side voltage $V_H$ of the transformer 22 as a function of the output terminal voltage $V_G$ of the synchronous machine 21, the active current $I_P$ and the reactive current $I_Q$, the output terminal target voltage $V_{Gref}$ of the synchronous machine 21 set by the voltage setter 28 is calculated by equation (13) below:

$$V_{Gref} = \sqrt{+e, \text{rad }} (V_{Href}$$
$$-X_D \cdot I_Q)^2$$
$$-(X_t \cdot I_P)^2 + ee$$
$$+X_t \cdot I_Q \quad (13)$$

where the voltage droop rate $X_D$ is determined empirically based on such conditions as the characteristics of the synchronous machine 21 and the power transmission system. For example, the voltage droop rate $X_D$ is set to a value corresponding to a few percent based on the capacity of the synchronous machine 21 (41).

Although the high-side voltage $V_H$ of the transformer 22 becomes lower than the high-side target voltage $V_{Href}$ as the reactive current $I_Q$ of the output current $I_G$ of the synchronous machine 21 increases in this embodiment, the high-side voltage $V_H$ of the transformer 22 may be regarded as being practically controlled by the target voltage $V_{Href}$, because the voltage droop rate $X_D$ is set to the value corresponding to a few percent.

In this embodiment, the output terminal target voltage $V_{Gref}$ of the synchronous machine 21 is set such that the high-side voltage $V_H$ of the transformer 22 varies with changes in the reactive current $I_Q$ only, regardless of changes in the active current $I_P$. Therefore, the high-side voltage $V_H$ of the transformer 22 does not vary as a result of load variations, or variations in active power, under normal operating conditions. This makes it possible to easily operate the synchronous machine 21 (41) in a controlled fashion with high reliability, effectively avoid the occurrence of the cross current between the synchronous machines connected to the power transmission system, and prevent overloading the synchronous machines. Furthermore, because the output terminal target voltage $V_{Gref}$ of the synchronous machine 21 is calculated by using equation (13) above derived from the earlier-mentioned equation (5) expressing the high-side voltage $V_H$ of the transformer 22 by the output terminal voltage $V_G$ of the synchronous machine 21, the active current $I_P$ and the reactive current $I_Q$, it is possible to reliably maintain the voltage applied to the transmission bus 25 by compensating for voltage changes occurring in the transformer 22 due to phase angle variations therein as in the first embodiment.

Eighth Embodiment

Figure 10:
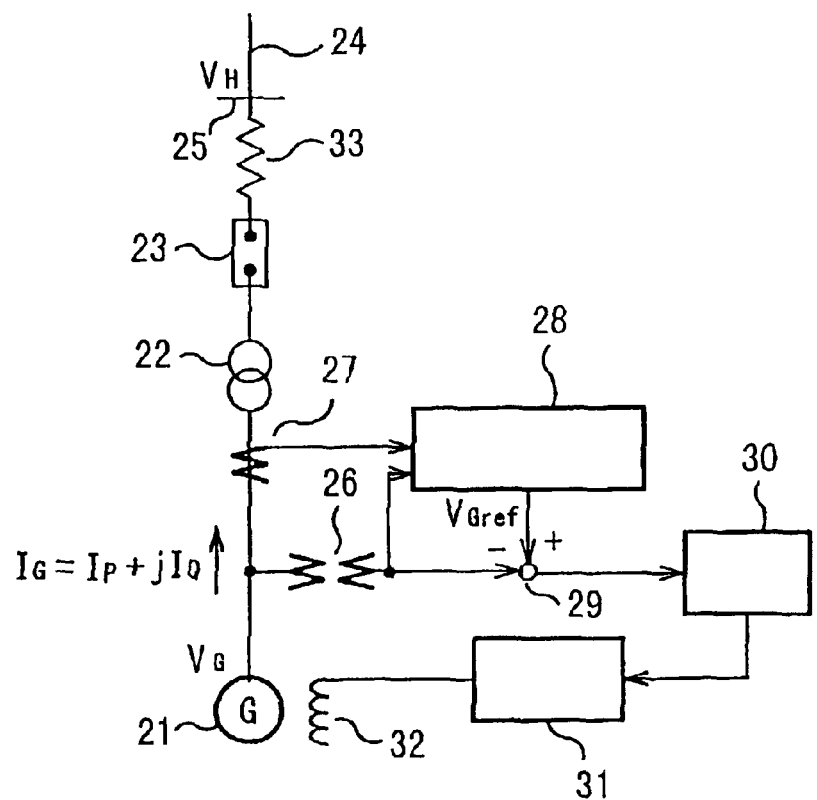
FIG. 10 is a configuration diagram mainly showing an excitation controller according to an eighth embodiment of the invention.

In the foregoing first to seventh embodiments, the output terminal target voltage $V_{Gref}$ of the synchronous machine 21 is set by the voltage setter 28 to compensate for the voltage drop occurring in the transformer 22. It is to be noted that there exists a resistance 33 between the synchronous machine 21 through the transformer 22 and the transmission bus 25 as shown in FIG. 10, so that it is necessary to take this resistance 33 into consideration when the transmission line length between the synchronous machine 21 and the transmission bus 25 is large.

An eighth embodiment of the invention employs an arrangement for setting the target voltage $V_{Gref}$ by the voltage setter 28 to compensate for not only a voltage drop corresponding to the reactance $X_t$ of the transformer 22 but also a voltage drop caused by the active current $I_P$ of the output current $I_G$ of the synchronous machine 21 and the resistance 33. This arrangement serves to further improve the reliability of control for maintaining the voltage applied to the transmission bus 25 and achieve an effect of maintaining a higher voltage on the power transmission system and its voltage stability.

Ninth Embodiment

Figure 11:
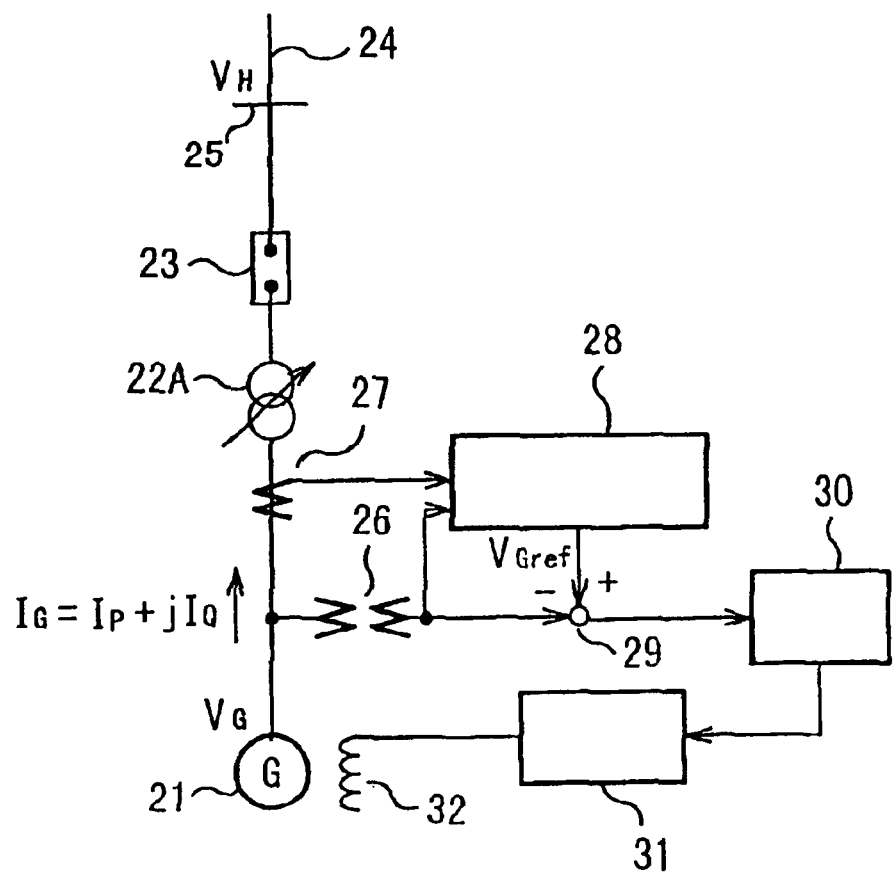
FIG. 11 is a configuration diagram mainly showing an excitation controller according to a ninth embodiment of the invention.

While the reactance $X_t$ of the transformer 22 is assumed to have a fixed value in the foregoing first to eighth embodiments, a transformer 22A having a function of controlling tap switching operation may be used instead of the transformer 22 as shown in FIG. 11.

In this ninth embodiment of the invention, the output terminal target voltage $V_{Gref}$ of the synchronous machine 21 is set by the voltage setter 28 according to a "tap ratio" selected when tap connection of the transformer 22A is changed. The tap switching operation alters the point of connection to a high-voltage winding of the transformer 22A. When the tap ratio is n, the number of turns of the high-voltage winding is 1/n of the rated number of turns of the high-voltage winding.

Given the tap ratio n, the output terminal voltage $V_G$ of the synchronous machine 21 shown by equation (6) of the first embodiment is expressed by equation (14) below:

$$V_G = \sqrt{+e,\text{rad }(V_H/n)^2}$$
$$-(n\cdot X_t\cdot I_P)^2 + ee$$
$$+n\cdot X_t\cdot I_Q \qquad (14)$$

and the output terminal target voltage $V_{Gref}$ of the synchronous machine 21 shown by equation (7) is expressed by equation (15) below:

$$V_{Gref} = \sqrt{+e,\text{rad }(V_{Href}/n)^2}$$
$$-(n\cdot X_t\cdot I_P)^2 + ee$$
$$+n\cdot X_t\cdot I_Q \qquad (15)$$

The output terminal target voltage $V_{Gref}$ of the synchronous machine 21 is calculated and set by using the active current $I_P$, the reactive current $I_Q$, the high-side target voltage $V_{Href}$ of the transformer 22A, the tap ratio n of the transformer 22A and its reactance $X_t$ as shown by equation (15) above. This arrangement makes it possible to maintain the high-side voltage $V_H$ of the transformer 22A, or the voltage applied to the transmission bus 25, at the high-side target voltage $V_{Href}$ with high reliability and improve voltage stability of the entire power transmission system, regardless of the point of tap connection of the transformer 22A.

While the transformer 22A having the tap switching control function of this embodiment is applied to the earlier-described control operation of the first embodiment, the transformer 22A is applicable in a similar fashion to the control operation of the foregoing second to eighth embodiments as well.

Tenth Embodiment

While the aforementioned ninth embodiment uses the tap ratio n of the transformer 22A for calculating the target voltage $V_{Gref}$, a voltage ratio $n_g$ concerning voltage conversion and a reactance ratio $n_r$ concerning reactance conversion do not necessarily coincide with each other in an actual transformer.

Taking this into consideration, a tenth embodiment of the invention uses a target voltage $V_{Gref}$ obtained by substituting the voltage ratio $n_g$ and the reactance ratio $n_r$ for the tap ratio n in equation (15) as shown by equation (16) below:

$$V_{Gref} = \sqrt{+e,\text{rad }(V_{Href}/n_g)^2}$$
$$-(n_r\cdot X_t\cdot I_P)^2 + ee$$
$$+n_r\cdot X_t\cdot I_Q \qquad (16)$$

The terminal target voltage $V_{Gref}$ of the synchronous machine 21 is calculated and set by using the voltage ratio $n_g$ and the reactance ratio $n_r$ corresponding to the tap ratio n which varies when the point of tap connection to the high-voltage winding of the transformer 22A is switched. This arrangement makes it possible to maintain the high-side voltage $V_H$ of the transformer 22A, or the voltage applied to the transmission bus 25, at the high-side target voltage $V_{Href}$ with higher accuracy and improve voltage stability of the entire power transmission system, regardless of the point of tap connection of the transformer 22A.

What is claimed is:

1. An excitation controller comprising:
a voltage detector for detecting output terminal voltage of a synchronous machine connected to a power transmission system through a transformer;
a current detector for detecting output current of the synchronous machine; and
a voltage setter for setting output terminal target voltage of the synchronous machine based on the output current of the synchronous machine detected by said current detector, reactance of the transformer, and high-side target voltage of the transformer, wherein
said excitation controller controls an excitation system of the synchronous machine based on deviation of the output terminal voltage detected by said voltage detector from the output terminal target voltage set by said voltage setter, and
active current and reactive current of the output current of the synchronous machine are calculated from the output current detected by said current detector and the output terminal voltage detected by said voltage detector, and said voltage setter calculates and sets the output terminal target voltage of the synchronous machine to compensate for a voltage drop in the transformer corresponding to a phase angle variation, which is a phase difference between high-voltage and low-voltage sides of the transformer.

2. The excitation controller according to claim 1, wherein a plurality of synchronous machines are connected to said power transmission system through respective transformers, and, in setting the output terminal target voltage of each of the synchronous machines, said voltage setter sets a voltage droop rate having a specific value representing influence of the reactive current for the high-side target voltage of each of the transformers and sets the output terminal target voltage of each of the synchronous machines such that high-side voltage of each of the transformers varies with changes in the reactive current only, regardless of changes in the active current, to prevent a cross current from flowing between the multiple synchronous machines.

3. The excitation controller according to claim 1, wherein a plurality of synchronous machines are connected to said power transmission system through respective transformers, and, in setting the output terminal target voltage of each of the synchronous machines, said voltage setter calculates the output terminal target voltage by substituting a value obtained by subtracting a specific amount from the reactance of each of the transformers, for the reactance of each of the transformers, to prevent a cross current from flowing between the multiple synchronous machines.

4. The excitation controller according to claim 3, wherein said voltage setter calculates the output terminal target voltage of each of the synchronous machines by substituting the value obtained by subtracting the specific amount from the reactance of each of the transformers, only for the reactance of each of the transformers, by which the value of the reactive current is multiplied, so that the output terminal target voltage of each of the synchronous machines decreases as the active current and the reactive current increase.

5. The excitation controller according to claim 3, wherein said voltage setter sets the output terminal target voltage of each of the synchronous machines so that a high-side voltage of each of the transformers matches the high-side target voltage when the active current and reactive current of the output current detected by said current detector coincide with reference values.

6. The excitation controller according to claim 5, wherein the reference values of the active current and the reactive current are preset according to the high-side target voltage of each of the transformers.

7. The excitation controller according to claim 1, wherein the transformer has a tap switching control and said voltage setter sets the output terminal target voltage of the synchronous machine according to a tap ratio selected when a tap connection of the transformer is changed.

8. The excitation controller according to claim 7, wherein said voltage setter sets the output terminal target voltage of the synchronous machine using a voltage ratio and a reactance ratio in place of the tap ratio.

* * * * *